(12) United States Patent
Wendt et al.

(10) Patent No.: US 11,397,693 B2
(45) Date of Patent: Jul. 26, 2022

(54) PERIPHERAL DEVICE, SYSTEM INCLUDING THE PERIPHERAL DEVICE AND METHOD

(71) Applicant: SIGNIFY HOLDING B.V., Eindhoven (NL)

(72) Inventors: Matthias Wendt, Wurselen (DE); Johan-Paul Marie Gerard Linnartz, Eindhoven (NL); Wolfgang Otto Budde, Aachen (DE); Anteneh Alemu Abbo, Eindhoven (NL); Georg Sauerlander, Aachen (DE); Reinhold Elferich, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 257 days.

(21) Appl. No.: 16/069,513

(22) PCT Filed: Jan. 23, 2017

(86) PCT No.: PCT/EP2017/051312
§ 371 (c)(1),
(2) Date: Jul. 11, 2018

(87) PCT Pub. No.: WO2017/129517
PCT Pub. Date: Aug. 3, 2017

(65) Prior Publication Data
US 2019/0012277 A1    Jan. 10, 2019

(30) Foreign Application Priority Data
Jan. 27, 2016    (EP) .................................... 16152902

(51) Int. Cl.
*G06F 3/00*    (2006.01)
*G06F 13/10*    (2006.01)
(Continued)

(52) U.S. Cl.
CPC ............ *G06F 13/102* (2013.01); *G06F 1/266* (2013.01); *H05B 47/19* (2020.01)

(58) Field of Classification Search
CPC .... G06F 13/102; G06F 1/266; H05B 37/0272
(Continued)

(56) References Cited

U.S. PATENT DOCUMENTS 6,804,727 B1 * 10/2004 Rademacher ......... G06F 3/1204
                                                                710/305
2001/0003205 A1    6/2001 Gilbert
(Continued)

FOREIGN PATENT DOCUMENTS

CN        101021822 A    8/2007
CN        202791496 U    3/2013
(Continued)

OTHER PUBLICATIONS

Brigham Steele, "Microchip Flexconnect Applications" AN1700, Microchip Technology Inc., pp. 1-15.
(Continued)

*Primary Examiner* — Titus Wong
(74) *Attorney, Agent, or Firm* — Daniel J. Piotrowski (57) ABSTRACT

The invention relates to a peripheral device for communicating with a host and for controlling a controlled device, to a system including such peripheral device and at least the controlled device and to a corresponding method including a communication and a controlling. In order to allow for a possibility for upgrading controlled devices with further functionality during their service life at low initial costs or efforts on the side of the controlled devices, it is provided for an interconnection between a portion of the system using a complex standard and another portion of the system not using such standard by means of the peripheral device having a dual purpose, as a peripheral device to the standard
(Continued)

compliant host and as a controlling device to the controlled device. In both cases, however, power is provided to the peripheral device from either the host or from the controlled device.

15 Claims, 2 Drawing Sheets

(51) Int. Cl.
*H05B 47/19* (2020.01)
*G06F 1/26* (2006.01)

(58) Field of Classification Search
USPC .......................................................... 710/14
See application file for complete search history.

(56) References Cited

U.S. PATENT DOCUMENTS

| | | | | |
|---|---|---|---|---|
| 2003/0025674 A1* | 2/2003 | Watanabe | ............. | G06F 1/1632 345/168 |
| 2004/0019732 A1* | 1/2004 | Overtoom | ........... | G06F 13/4022 710/313 |
| 2004/0133722 A1* | 7/2004 | Croyle | .................. | G06F 13/387 710/105 |
| 2005/0132092 A1* | 6/2005 | Mylly | .................... | G06F 9/4411 710/8 |
| 2005/0170699 A1* | 8/2005 | Overtoom | ............ | H01R 31/065 439/639 |
| 2005/0239523 A1 | 10/2005 | Longman et al. | | |
| 2006/0080490 A1 | 4/2006 | Tang | | |
| 2006/0087495 A1 | 4/2006 | Davis et al. | | |
| 2007/0233910 A1* | 10/2007 | Paley | .................... | G06F 3/0622 710/36 |
| 2009/0109649 A1* | 4/2009 | Harris | ................... | G06F 1/1616 362/23.03 |
| 2009/0234977 A1 | 9/2009 | Kale et al. | | |
| 2009/0295762 A1 | 12/2009 | Fan et al. | | |
| 2009/0307380 A1* | 12/2009 | Lee | ........................ | G06F 13/387 710/14 |
| 2010/0215509 A1 | 8/2010 | Krishnamoorthy et al. | | |
| 2013/0191568 A1 | 7/2013 | Hershko et al. | | |
| 2014/0129740 A1* | 5/2014 | Wang | ........................ | G06F 3/00 710/15 |
| 2014/0181350 A1* | 6/2014 | Pedro | .................. | G06F 13/4077 710/313 |
| 2015/0089092 A1* | 3/2015 | Voto | ...................... | G06F 13/385 710/14 |

FOREIGN PATENT DOCUMENTS

| | | |
|---|---|---|
| CN | 10402110 A | 9/2014 |
| EP | 1771020 A3 | 4/2007 |
| EP | 1950665 A1 | 7/2008 |
| WO | 2014073913 A1 | 5/2014 |

OTHER PUBLICATIONS

T'Light—The most Talented Light, http://www.tlight.cc/en/index.asp.
Power over Ethernet.com, http://www.poweroverethernet.com/.
Using smartphones' serial buses (e.g. USB, SD Card, etc) to control Servo motors, http://www.usb.org/developers/docs/usb_20.zip.
Craig Peacock, "USB in a Nutshell—Chapter 2—Hardware", beyondlogic.org, Sep. 17, 2010. http://www.beyondlogic.org/usbnutshell/usb2.shtml.
Ultra-small vusbtiny AVR programmer, Dec. 19, 2011, http://dangerousprototypes.com/2011/12/19/ultra-small-vusbtiny-avr-programmer/.

* cited by examiner

PRIOR ART

PERIPHERAL DEVICE, SYSTEM INCLUDING THE PERIPHERAL DEVICE AND METHOD

CROSS-REFERENCE TO PRIOR APPLICATIONS

This application is the U.S. National Phase application under 35 U.S.C. § 371 of International Application No. PCT/EP2017/051312, filed on Jan. 23, 2017 which claims the benefit of European Patent Application No. 16152902.9, filed on Jan. 27, 2016. These applications are hereby incorporated by reference herein.

FIELD OF THE INVENTION

The present invention relates to a peripheral device for communicating with a host and for controlling a controlled device, to a system including the peripheral device and at least the controlled device and to a method including a communication between a host and the peripheral device and a controlling of a controlled device by the peripheral device.

BACKGROUND OF THE INVENTION

US 2009/0234977 A1 discloses an apparatus comprising a single memory device providing data storage, a controller for controlling data transfer to and from the data storage, and first and second bus connector plugs, wherein each plug has contacts for connecting with the power, ground, and data contacts of a port of a host system. The power and ground contacts of the first and second plugs are coupled together to provide power to the apparatus through either or both plugs. Data from either or both plugs is communicated with the controller depending upon which plugs are coupled to a port. The controller is responsible for controlling the read and write operations of the data storage. The apparatus may be any type of external memory device, such as a flash drive, or a peripheral device having a high data transfer rate, such as a digital video camera.

In a system like a lighting system, where a plurality of elements like luminaires are to be installed, it is conventionally to be decided upon installing the elements what functionality the elements should exhibit. Deciding the functionality requirements can be a difficult and complex process, as additional functions normally increase the initial costs, while it is not always clear which of such additional functions may be needed later on during the service life of the system. Upgrading a system later on may cause additional costs or may even be impossible or at least impracticable.

A conceivable approach on this might include equipping the elements such that the elements can be remotely controlled. However, providing the additional equipment for remote controllability also imposes additional costs, possibly even beyond the additional costs for certain optional functions.

Another conceivable approach might include providing the elements with an interface like an USB (host) port, so an additional piece of equipment may be plugged into the USB port if needed.

Typical USB host ports would require substantial hardware and firmware foot prints to integrate them into an element like a luminaire. For instance, the lamp driver would need to have a micro controller being capable to do the full uPnP protocol as being required by the USB standard. The USB standard introduced this as it allows automatically detecting new devices connected to the USB port and automatically select/download the appropriate driver software. However, circuitry of low-cost elements (e.g. lamp drivers) would typically use low profile micro controllers which cannot execute such functions, or would even lack a microcontroller entirely. Thus, a default availability of an USB port in an element like a luminaire would economically not be practical.

SUMMARY OF THE INVENTION

It is an object of the present invention to provide for a peripheral device for communicating with a host and for controlling a controlled device, to a system including the peripheral device and at least the controlled device and to a method including a communication between a host and the peripheral device and a controlling of a controlled device by the peripheral device, which allow for a possibility for upgrading controlled devices with further functionality during their service life at low initial costs or efforts on the side of the controlled devices.

In a first aspect of the present invention a peripheral device is presented for communicating with a host and for controlling a controlled device, comprising a plurality of terminals, including a first pair of terminals and a second pair of terminals, a communication unit coupled to the first pair of terminals, a controlling unit coupled to at least two terminals of the first and second pair of terminals, wherein the peripheral device is arranged to receive operating power via the second pair of terminals, wherein the peripheral device is further arranged to selectively operate in at least a first mode and a second mode, the first mode being a mode in which the communication unit is operable for communicating with the host in accordance with a predetermined standard and the peripheral device is arranged for receiving the operating power via the second pair of terminals from the host, and the second mode being a mode in which the controlling unit is operable for controlling the controlled device, the controlling not being related to the operating power, and the peripheral device is arranged for receiving the operating power via the second pair of terminals from the controlled device.

In a second aspect of the present invention a system including the peripheral device according to the invention and a controlled device is presented, wherein the controlled device includes a plurality of device terminals for being coupled to the plurality of terminals of the peripheral device, a power supply unit for supplying operating power to the peripheral device via the second pair of terminals and an operation circuitry for being coupled to and controlled by the controlling unit of the peripheral device.

In a third aspect of the present invention a method is presented, including a communication between a host and a peripheral device and a controlling of a controlled device by the peripheral device, the method comprising a first coupling step of coupling the peripheral device and the host, a communication step in which the peripheral device receives operating power from the host via a second pair of terminals of a plurality of terminals of the peripheral device and operates in a first mode including a communication between the peripheral device and the host in accordance with a predetermined standard via a first pair of terminals of the plurality of terminals, a separation step of separating the peripheral device and the host, a second coupling step of coupling the peripheral device and the controlled device, and a controlling step in which the peripheral device receives operating power via the second pair of terminals from the controlled device and operates in a second mode including a control of the controlled device via at least two terminals of the first and second pair of terminals, the control not being related to the operating power.

The present invention gives the opportunity to delay the timing of investments: at installation of, for example, a lighting system according to the invention, there is no need to decide on the control functionality (thus maintaining full flexibility in system functionality), and there is also no cost penalty for a control function which at the time of installation possibly may still lack a business case. At the moment where such business case emerges, the system can be easily reconfigured into the desired control functionality (connectivity, sensing, advanced algorithms), and the resulting costs are then covered by the specific business case.

In this way, even upgrades of the lighting driver functionality are possible: assume a low-cost, simple analogue fixed-output LED driver (itself or the lamp as an example of a controlled device), which by means of a simple 2-wire interface supplied through the USB socket can be made dimmable in response to a local sensor signal (sensor embedded in the peripheral device/USB module) or according to remote control commands received by a connectivity module as e.g. a ZigBee radio (also embedded in the peripheral device/USB module).

The present invention, if one compares the host (using, for example, the USB protocol and following the standard) and the controlled device (not using the USB protocol and not following any USB standard), provides for an interconnection between a portion of a system using the complex (e.g. USB) standard and another portion of the system not using such standard by means of the peripheral device having a dual purpose, as a peripheral device to the standard compliant host and as a controlling device to the controlled device. In both cases, however, power is provided to the peripheral device from either the host or from the controlled device.

It is to be noted that the controlling by the controlling unit is not necessarily provided via the terminals of just the first pair of terminals (even though it is indeed possible that the controlling unit performs the controlling by means of the first pair of terminals, i.e. the same terminals used by the communication unit for communication in the first mode). It is indeed possible that the control is provided using a combination of terminals from both, the first and the second pair of terminals, as well as using just the terminals of the second pair of terminals. A possibility for using (possibly just) the two terminals of the second pair includes a modulation of the current drawn from the supply in a way that allows easy detection of a low or high current, while is a simple way of transferring, for example, a PWM signal.

Furthermore, if, for example, the predetermined standard would be a USB 2 standard, the four terminals provided in a compliant connector may constitute the plurality of terminals. In other words, there might be cases where the plurality of terminals is constituted by just the first and the second pair of terminals and no further terminals are involved with the provision of operating power to the peripheral device, the communication between the host and the peripheral device and the control of the controlled device by peripheral device. It is noted, however, that the invention is not limited to this. Specifically, the plurality of terminals of the peripheral device may include further terminals, which may also be involved with provision of power, communication and control.

In a preferred embodiment, the controlling unit is arranged to output one of an analogue signal, a pulse width modulated signal and a digital signal to the controlled device via the at least two terminals.

In the context of a lighting system, for example, the controlling provided by the peripheral device over the controlled device may include a dimming, which may be provided by, for example, an analogue signal provided by the peripheral device to a circuitry in the controlled device, or similarly by a pulse width modulated (PWM) signal. Additionally, there might be some protocol used for transmitting control information from the peripheral device to a microcontroller in the controlled device, e.g. according to protocols or buses like PC (Inter-Integrated Circuit), UART (universal asynchronous receiver/transmitter) or DALI (Digital Addressable Lighting Interface).

In a preferred embodiment, the peripheral device further comprises a detection unit arranged to detect whether the peripheral device is connected to the host and/or to the controlled device, wherein the detection unit is arranged to control the peripheral device for a mode switching to the first or second mode based on a result of the detection.

It is possible that the peripheral device is by default either in the first or in the second mode, such that the detection unit would only have to determine whether the current connection indeed corresponds to such default mode and may cause a mode switch otherwise. It is also possible that the peripheral device is by default in a third mode upon powering up and the detection unit positively determines whether there is a connection to a host or to a controlled device and causes then a switch to the proper mode.

In a preferred embodiment, the peripheral device further comprises a switch for causing the peripheral device to operate in the first mode when the switch is in a first state and for causing the peripheral device to operate in the second mode when the switch is in a second state.

The switch allows a user to select the desired mode directly by operating the switch.

In a preferred modification of the above embodiment, the peripheral device further comprises a detection unit arranged to detect whether the peripheral device is connected to the host and/or to the controlled device, wherein the detection unit is arranged to control the peripheral device for a mode switching to the first or second mode based on a result of the detection when the switch is in a third state.

The additional option of a detection state for the switch gives the user additional freedom is using the peripheral device.

In a preferred embodiment, the peripheral device further comprises a sensor and/or a communication interface coupled to the controlling unit, wherein the controlling unit is arranged for controlling the controlled device according to an input from the sensor and/or the communication interface.

Examples of sensors may be light sensors (detecting the brightness in the area of the controlled device and the peripheral device) or proximity sensors (detecting the presence of a person in a certain area). A communication interface may provide the possibility for a communication with, e.g. a central control station. In a preferred modification of this embodiment, the communication interface is arranged for a wireless communication, for example, according to WiFi, Bluetooth and/or ZigBee, even though the communication is not limited to wireless communication. Furthermore, the communication is not limited to just receiving control instruction or the like on the side of the peripheral device but may (additionally or alternatively)

include communication from the peripheral device, e.g. transmission of an operation state of the peripheral device and/or the controlled device.

In a preferred embodiment, the predetermined standard is an USB standard or an IEEE 1394 standard.

Standards like USB standards and IEEE 1394 standard (including those branded as "FireWire", "i.Link" and "Lynx") are in use in a large variety of contexts and host devices compliant with such standard are widely spread.

In terms of such USB standard, the host, in the first mode of the peripheral device would typically have the master role in regard to the communication, with the peripheral device having the role of the slave; even though in the context of USB there are also arrangements known in which such roles may be swapped (e.g. USB On-The-Go).

A USB1 or USB2 standard plug includes four pins ($V_{cc}$, Data−, Data+ and Ground), while even a plug adhering to an USB3.x standard includes such pins for backwards compatibility. The above mentioned four pins may be employed as the first and second pair of terminals, with Data− and Data+ forming the first pair of terminals used for communication with the host, while the operating power for the peripheral device is provided by $V_{cc}$ and Ground. The control of the controlled device may use any of these pins.

It is not necessary the case that elements normally provided in or around USB plugs are also present in embodiment of the present invention, as long as these elements (like a metal shield around the connector) are not related to the functionality of the invention.

In a preferred embodiment, the peripheral device further comprises a receiving unit coupled to the plurality of terminals, wherein the receiving unit is arranged to receive information transmitted by the controlled device via the plurality of terminals.

In a preferred modification of the above embodiment, the receiving unit is coupled to the second pair of terminals and arranged to detect transmitted information from a change in the supplied operating power.

The controlled device may, in a simple yet efficient manner, transmit information to the peripheral device (possibly for further transmission by the peripheral device or for storing in a memory of the peripheral device) by modulating the power supply in terms of amplitude and/or frequency.

In a preferred embodiment, the system further comprises a host arranged for communicating with the peripheral device in accordance with the USB standard.

In a preferred embodiment of the system, the peripheral device and the controlled device jointly comprise an operation circuit for operating an operating unit of the controlled device, wherein a first portion of the operation circuit is provided in the peripheral device and a second portion of the operation circuit is provided in the controlled device.

The controlled device may include a basic function (e.g. providing light) and the second portion of the operation circuitry, which becomes only operational when completed by connecting the peripheral device, i.e. the first portion thereof.

In a preferred embodiment of the system, the controlled device is a luminaire.

In a further aspect of the present invention a software product for a peripheral device is presented, the software product comprising program code means for causing the peripheral device according the invention to carry out the steps of the method according to the invention when the software product is run on the peripheral device.

It shall be understood that the peripheral device of claim 1, the system of claim 10, the method of claim 14, and the computer program of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
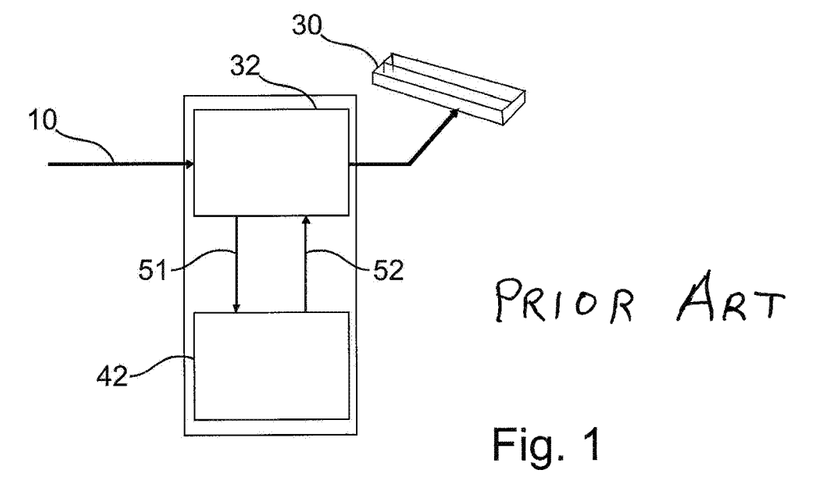
FIG. 1 shows a conventional arrangement for a control of a luminaire.

FIG. 1 shows a conventional arrangement for a control of a luminaire. A conventional luminaire arrangement with a driver 32 and a control means 42 is depicted in FIG. 1. The arrangement includes an optical part with light generation means 30 which is operated by the lamp driver 32 which is, in turn, powered from mains 10. The control means 42 (e.g. a processor) gets powered via line 51 and controls e.g. a dim level of the driver 32 via signal 52.

Figure 2:
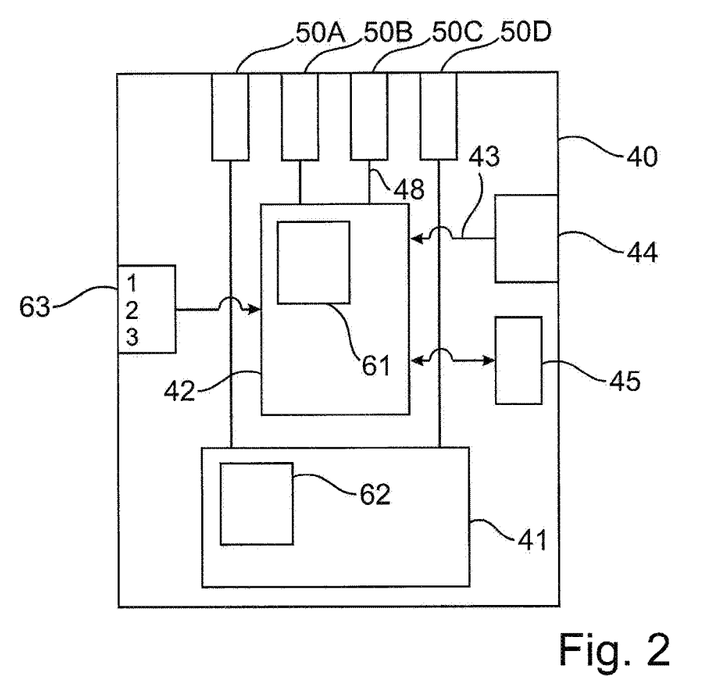
FIG. 2 shows a peripheral device in accordance with an embodiment of the invention.

FIG. 2 shows a peripheral device in accordance with an embodiment of the invention.

The peripheral device 40 includes four terminals 50A, 50B, 50C, 50D (which may be provided in form of a USB plug (see FIG. 3)).

Two of terminals 50B, 50C are coupled to a light controller 42, having the function of a communication unit and the function of a controlling unit. The other two terminals 50A, 50D are coupled to a power unit 41, which handles the operating power of the peripheral device 40.

The peripheral device 40 further includes a sensor 44, coupled via a sensor line 43 to the light controller 42. Additionally, the light controller 42 is in interaction with a communication interface 45 of the light controller 40, which provides for a wireless communication.

Ye further, the peripheral device includes a switch 63 having three settings, which is also coupled to the light controller 42.

The light controller 42 includes a detection unit 61, while the power unit 41 includes a receiving unit 62.

Figure 3:
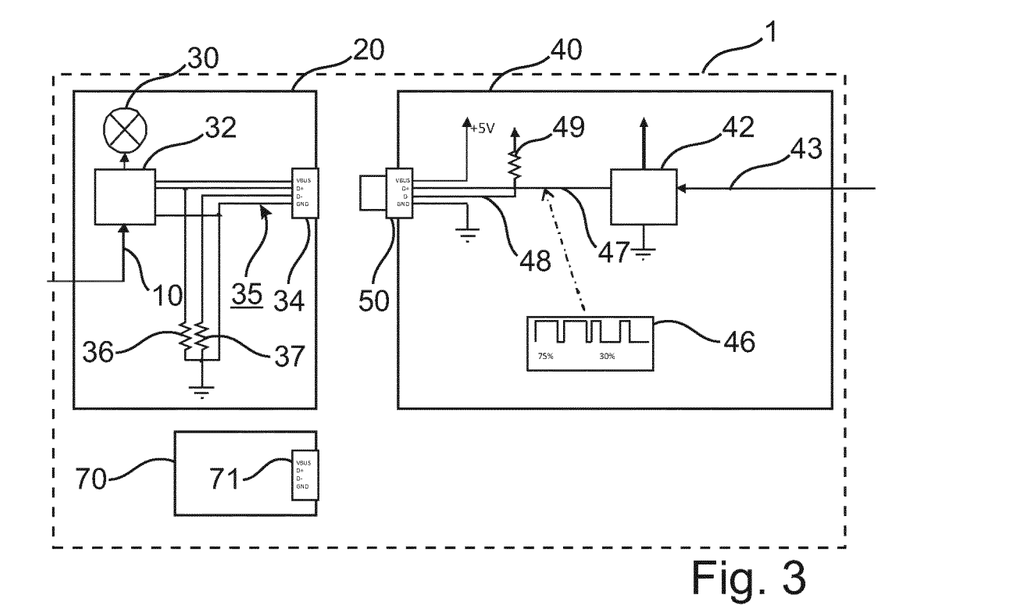
FIG. 3 shows a system including a peripheral device, a controlled device and a host in accordance with another embodiment of the invention.

In a first mode, the peripheral device 40 operates as a USB slave device when connected to a USB host (see FIG. 3). The light controller 42 (communication unit) communicates with the USB host via the terminals 50B, 50C in accordance with the USB protocol. The power unit 41 receives the operating power for the peripheral device from the USB host.

In a second mode, the peripheral device 40 controls a controlled device (see FIG. 3). Here, the light controller 42 functions as a controlling unit, providing control signals to the controlled device via the terminals 50B, 50C, while the power unit 41 receives the operating power from the controlled device.

For switching between the first and the second mode depending on whether the peripheral device 40 is coupled to a controlled device or to a host, the detection unit 61 is provided. Additionally, the switch 63 is used, which overrides the detection by the detection unit in two of its three settings. One setting fixes the first mode, another setting fixes the second mode and a third setting allows the detection by the detection unit 61 to be decisive.

At least in the second mode, the reception unit 62 of the power unit monitors the operating power provided by the controlled device and derives transmitted information from the controlled device therefrom.

Information provided from the sensor 44 and/or the communication interface 45 is used by the light controller 42 to determine the control of the controlled device.

FIG. 3 shows a system including a peripheral device, a controlled device and a host in accordance with another embodiment of the invention.

The system 1 includes the peripheral device 40, the controlled device 20 and a host 70.

The peripheral device 40 is arranged to be powered by the two terminals (second pair of terminals) of a USB compliant plug 50 other than the data terminal ($V_{bus}$ and Ground), wherein the $V_{bus}$ delivers +5 V against ground. The two data pins are used for the control signal and do not, in the mode where the controlled device is controlled, use the typical phy and uPnP technology of USB but a simpler information and signal transfer technology.

In the present embodiment the peripheral device generates a dim PWM signal (46) which is put to the data pins (first pair of terminals). The PWM signal 46 is sent over the Data+ pin 47. In order to make sure that any "normal" USB host will not recognize the peripheral device as a USB device in this mode, data pin Data− 48 is pulled up to $V_{bus}$ by means of a resistor 49.

The peripheral device 40 includes a light controller 42 that uses an external signal 43 e.g. from a presence detector to control the dim level from 75% to 30% when no person is detected.

The overall circuitry of the peripheral device may be mounted on a PCB (not shown) which directly fits into a USB socket (see 34, 71) like a conventional USB stick.

The controlled device 20 includes a lighting means 30, which is driven by a driver 32, which is powered by mains 10. The driver 32 is furthermore coupled to a socket 34 with four lines 35. In the circuitry of the lines 35, two resistors 36, 37 are provided between the data lines and the ground.

The host 70 is a conventional PC and also includes a USB socket 71. Besides PWM control also more complex communication from the peripheral device 40 to the luminaire 20 can be used in other implementation. It is conceived, for example, to put I2C signals on the two data pins of the connector, thus allowing for transferring multiple parameters and allowing for more sophisticated control techniques.

Alternatively, differential DALI signals may be placed on the data pins and normal DALI lamp drivers may be controlled.

In another embodiment UART signaling is used, where instead of the differential signaling (D+, D−) as in standard USB, the interface is mapped to receive/transmit (RX, TX) signal pairs. Such signaling scheme is available in many low-cost micro-controllers (with small RAM and FLASH sizes) allowing bi-directional data flow: commands to the driver of the controlled device and sensed data to the peripheral device. In such case, a PWM control to dim the light may be generated by the MCU in the driver as a response to the command.

Figure 4:
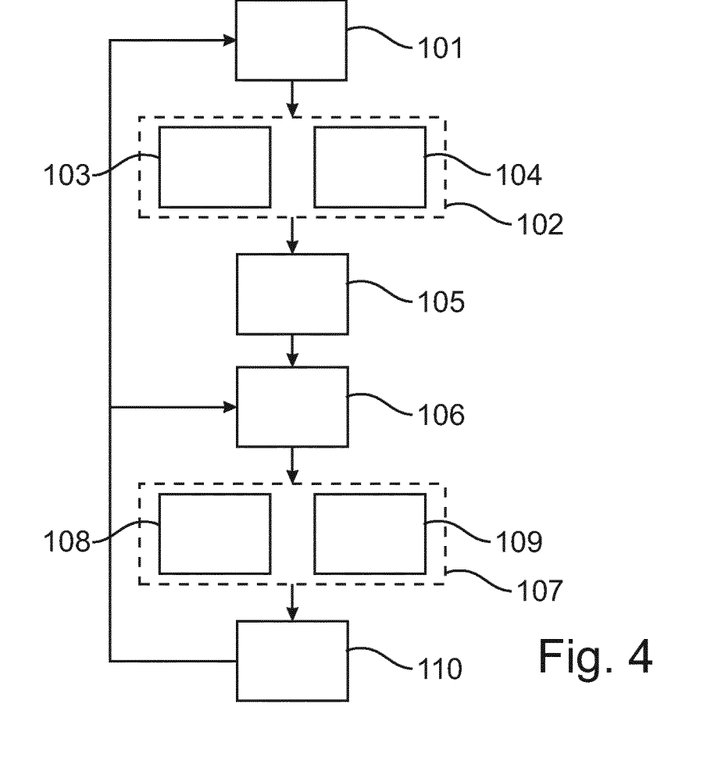
FIG. 4 shows a flow diagram illustrating a method including a communication between a host and a peripheral device and a controlling of a controlled device by the peripheral device in accordance with an embodiment of the invention.

FIG. 4 shows a flow diagram illustrating a method including a communication between a host and a peripheral device and a controlling of a controlled device by the peripheral device in accordance with an embodiment of the invention. The method discussed here applies, for example, to the system shown in FIG. 3.

In the flow diagram shown in FIG. 4, the process starts with a first coupling step 101 of coupling the peripheral device and the host.

This is followed by a communication step 102. The communication step 102 includes a first power receiving step 103 in which the peripheral device receives operating power from the host via a second pair of terminals of a plurality of terminals of the peripheral device. In this case, the peripheral device operates in a first mode and the communication step 102 further includes a first operation step 104 of communication between the peripheral device and the host in accordance with a predetermined standard via a first pair of terminals of the plurality of terminals.

After the communication step 102, a first separation step 105 follows of separating the peripheral device and the host.

This, in turn, is followed by a second coupling step 106 of coupling the peripheral device and the controlled device.

In a particular implementation, the coupling in the first and the second coupling step 101, 106, respectively, is provided by connecting a USB plug of the peripheral device to a corresponding USB socket of the host or the controlled device.

After the coupling between controlled device and peripheral device, a controlling step 107 follows, in which the peripheral device receives operating power from the controlled device via the second pair of terminals in a second power receiving step 108. Further, the peripheral device operates now in a second mode including a second operation step in which a control of the controlled device via at least two terminals of the first and second pair of terminals is provided, the control not being related to the operating power.

Finally, the coupling between the controlled device and the peripheral device is ended in a second separation step 110, so that the peripheral device may again be coupled to the host (or another host or another controlled device).

It is not necessarily the case that the peripheral device is first connected to a host, e.g. for configuration, as the peripheral device may be commissioned during manufacturing, while nevertheless an on-site configuration (either initial or later on) is still possible. The addition of network functionality to an existing lighting system requires a commissioning step, which ensures proper binding of physical luminaires with their representation in the network.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

For example, it is possible to operate the invention in an embodiment wherein controlled device is a device different from (an operating device of) a luminaire, as the invention is not limited as to the particular details of the controlled device.

The invention allows, for example, for an alternative use of a USB-port (i.e. the physical configuration of the socket) which allows putting most of the cost on the USB-Module side and not on the side of the controlled device. In this way it is be possible having the USB ports as nearly cost-neutral addition to lamp drivers. Proper definition of the use of the pins of the USB port guarantees that "normal" USB hosts will not get harmed if the peripheral device modules get connected (e.g. in the wrong mode). In the Non-USB-mode of the peripheral device, a USB host will typically not be able to identify the device and make full use of these modules. Vice versa, USB modules will not get harmed when plugged into a luminaire (as an example of a controlled device) with reversed USB architecture, but (except for supply of USB power) there will be no functionality accessible to such USB module.

The benefit is in a much simpler interface on the luminaire side. The peripheral device (e.g. USB module) gets power from the USB connector like known from state of the art USB. The peripheral device may use, for example, a PWM signal on the data pins which directly controls the PWM input of a lamp driver in the luminaire (as an example of a controlled device).

In comparison to the arrangement of FIG. 1, the present invention provides for an exchangeability of the control means. Such exchangeability allows for easy upgrades of a luminaire (or other system in which the invention is employed) and easy configuration of the platform with an application dependant control means. This is accomplished by putting the control means into a module which is mechanically and electrically connected by means of a socket/plug means. However, the invention not only provides for the exchangeability, as the peripheral device uses the same physical features of the plug for communication with a host. Such host, e.g. a computer, may such configure the peripheral device based on such communication according to, for example, the USB standard.

The implementations of the present invention may be categorized in different classes, for example:

Class A: A luminaire (or other device) just providing power to a peripheral device without providing for further functionality.

Class B1: The controlled device supports power for the peripheral device and accepts an analogue dimming signal (e.g. via the data pins of the USB port).

Class B2: The controlled device supports power for the peripheral device and allows for a PWM dimming (e.g. via the data pins of the USB port).

Class C: The controlled device supports power for the peripheral device and bi-directional communication (e.g. according to I2C) (e.g. via the data pins of the USB port), while such implementation is particularly advantageous for digital drivers having an in-built microcontroller.

In case of a luminaire being the controlled device, the control signals provided by the peripheral device may be shared (in case of a class B) between different light engines (e.g. LED modules) with a light engine being controlled in the same way, while an addressing capability of, for example, the I2C bus in class C would allow even individual control of light engines in a luminaire.

The peripheral device may be able to distinguish different lamp drivers (or controlled devices in general), e.g. by means of a signature impedance or through configuration via an NFC interface, in order to adapt the control signals on the (data) pins accordingly. This allows for using the same peripheral device with different controlled devices, automatically changing, for example, from PWM to I2C or DALI dependant on the recognized driver.

It is further foreseen that managed "USB" Power Delivery may be used to guarantee that not compatible USB devices will not get power from the controlled device.

The simple interface is used to verify if the plug-in device is allowed to communicate to the driver according to the present invention and power is interrupted if the device is not a compatible one.

In one implementation, the verification process starts by checking if a device is connected to the "USB" port by sensing the current that is drawn. Following this, the driver of the controlled device checks for a special signature from the peripheral device that should come within a predefined interval from the moment port connection is detected.

Another way of verification is by checking if the reply for an interrogation results in the correct response.

Power disconnection may be realized by disabling the power regulator or disconnecting the "USB" power line using a power switch. Power re-connection may be achieved by checking if the current drawn from the port has decreased below a certain threshold.

Besides the digital control approaches also analog control techniques can be used. For example, it is possible to use the voltage (referenced by the GND pin) on one or both digital signal pins Data+ (UPIN2) and Data− (UPIN3) for a signaling voltage. For this beneficially the signal to control the driver linearly is in the forbidden range of digital signals e.g. 0.7V to 3.7V and would be undefined for a digital input.

It can be e.g. used to signal in such way: UPIN2=0.7V means 0% light intensity (lamp is off); UPIN2=1.7V means 33% light intensity; UPIN2=2.7V means 66% light intensity and UPIN2=3.7V means 100% light intensity (lamp is fully on). Such a mapping has the benefit that a low level would keep the lamp off and a high level set it to full on.

Resistors on the lamp driver side UPIN2 may be used to guarantee that if no peripheral device is connected the voltage UPIN2 is above 3.7V and hence the driver will be always fully on. Different mappings of voltages UPIN2 and UPIN3 to the lamp control are possible. For example by extending these over the above listed dimming levels to color or color temperature can also be defined.

Even if the interface is not isolated, e.g. for size or cost reasons, the interface is still supposed to be mains-isolated to cope with the safety standards. In such case it can be advantageous to derive the only auxiliary power for the USB in an isolating manner.

Beside the conventional approach of using an isolating transformer, this can be done more cost effectively by means of a pair of small Y-capacitors (e.g. 10 to 100 pF) that is connected drain and source (or collector and emitter) of the (or one) switching transistor of the driver's chopper or inverter. This concept applies to virtually all SMPS converter types including single switch buck, boost, buck-boost and fly-back.

Secondly, the set-point signal(s) received from the USB host (e.g. PWM dimming pattern) or a locally derived signal might be sent in an isolating manner to the feedback controller of the driver, e.g. via an opto-coupler.

It might be useful to provide a return channel from the controlled device to the peripheral device, e.g. to communicate a failure, the type of driver or any address data (if exiting), configuration data and the like. Further it is of benefit to send the measured control value (e.g. the output current) or a control error.

One way to implement such a return channel—that does not make use of the USB data pin—refers to the above mentioned capacitive supply. A small additional transistor (e.g. between ground and second Y-capacitor) may periodically interrupt the auxiliary power transfer, which in connection with the filter on the isolated end results in a modulation of the 5 V supply that can be sensed by the peripheral device. In the interest of simplicity on the driver side e.g. the interruption pulse width could be modulated which controls the amplitude of the modulation added to the 5 V supply (e.g. 50 . . . 500 mV). The interruption frequency can as well or in addition be used (e.g. 1 Hz . . . 10 Hz).

Examples of functionality the peripheral device according to the invention may bring to the controlled device, e.g. the luminaire, include (but are not limited to) a wireless range extender e.g. for WiFi, a wireless bridge e.g. between WiFi and ZigBee; a sensing function for local control of the LED driver, sensing and connectivity functions as part of a sensor network, connectivity-enabled control functions, connectivity-enabled control and data retrieval functions, an IR receiver for luminaire control, a wireless loudspeaker, a low bit rate (event-based) wireless (e.g. WiFi) access point, making use of the network connection (this can be used to support sensing functions with low data rate output), a wireless low-power camera module; a upgrade kit to turn a simple analogue driver into a digital driver, and a wireless CodedLight module that upgrades the existing luminaire driver into a CodedLight-enabled driver.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like communicating, controlling, outputting, mode switching, detecting, sensing, and coupling etc. can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A peripheral device for communicating with a host and for controlling a controlled device, comprising:
   a plurality of terminals, including a first pair of terminals and a second pair of terminals,
   a communication unit coupled to the first pair of terminals,
   a controlling unit, including a lighting generation unit, coupled to at least two terminals selected from the first and second pair of terminals,
   a detection unit arranged to detect whether the peripheral device is connected to the host or to the controlled device,
   wherein the peripheral device is arranged to receive operating power via the second pair of terminals,
   wherein the peripheral device is further arranged to selectively operate in at least a first mode and a second mode,
   the first mode being a mode in which the communication unit is operable for communicating with the host in accordance with a predetermined standard and the peripheral device is arranged for receiving the operating power from the host, and
   the second mode being a mode in which the controlling unit is operable for controlling the controlled device using a pulse width modulated (PWM) signal to enable control of at least dimming of the light generation unit, the controlling not including operating power, and the peripheral device is arranged for receiving the operating power from the controlled device,
   wherein the detection unit is arranged to control the peripheral device to switch between the first and second mode based on a result of the detection.

2. The peripheral device according to claim 1, wherein the controlling unit is arranged to output one of an analogue signal, a pulse width modulated signal and a digital signal to the controlled device via the at least two terminals.

3. The peripheral device according to claim 1, comprising: a switch for causing the peripheral device to operate in the first mode when the switch is in a first state and for causing the peripheral device to operate in the second mode when the switch is in a second state; wherein the detection unit arranged to detect whether the peripheral device is connected to the host or to the controlled device, wherein the detection unit is arranged to control the peripheral device for a mode switching to the first or second mode based on a result of the detection when the switch is in a third state.

4. The peripheral device according to claim 1, comprising: a sensor and/or a communication interface coupled to the controlling unit, wherein the controlling unit is arranged for controlling the controlled device according to an input from the sensor and/or the communication interface.

5. The peripheral device according to claim 1, wherein the predetermined standard is an USB standard or an IEEE 1394 standard.

6. The peripheral device according to claim 1, comprising: a receiving unit coupled to the plurality of terminals, wherein the receiving unit is arranged to receive information transmitted by the controlled device via the plurality of terminals.

7. The peripheral device according to claim 6, wherein the receiving unit is coupled to the second pair of terminals and arranged to detect transmitted information from a change in the supplied operating power.

8. A system including the peripheral device according to claim 1 and a controlled device,
   wherein the controlled device includes a plurality of device terminals for being coupled to the plurality of terminals of the peripheral device, a power supply unit for supplying operating power to the peripheral device via the second pair of terminals and an operation circuitry for being coupled to and controlled by the controlling unit of the peripheral device.

9. The system according to claim 8, further comprising a host arranged for communicating with the peripheral device in accordance with the predetermined standard.

10. The system according to claim 8, wherein the peripheral device and the controlled device jointly comprise an operation circuit for operating an operating unit of the controlled device, wherein a first portion of the operation circuit is provided in the peripheral device and a second portion of the operation circuit is provided in the controlled device.

11. The system according to claim 8, wherein the controlled device is a luminaire.

12. A method including a communication between a host and a peripheral device and a controlling of a controlled device by the peripheral device, the method comprising:
- a first coupling step of coupling the peripheral device and the host,
- detecting via a detection unit that the peripheral device is connected to the host,
- a communication step in which the peripheral device receives operating power from the host via a second pair of terminals of a plurality of terminals of the peripheral device and operates in a first mode including a communication between the peripheral device and the host in accordance with a predetermined standard via a first pair of terminals of the plurality of terminals,
- a separation step of separating the peripheral device and the host,
- a second coupling step of coupling the peripheral device and the controlled device,
- detecting via the detection unit that the peripheral device is connected to the controlled device, and
- a controlling step in which the peripheral device receives operating power from the controlled device via the second pair of terminals and operates in a second mode including a control of the controlled device via at least two terminals of the first and second pair of terminals using a nuke width modulated (PWM) signal, the control not including operating power.

13. A software product for a peripheral device, the software product comprising program code means for causing the peripheral device according to claim 1 to carry out the steps of the method as claimed in claim 12 when the software product is run on the peripheral device.

14. A system including the peripheral device according to claim 1, a host, and a controlled device, whereby the peripheral device establishes an indirect interconnection between the host and the controlled device, wherein the peripheral device communicates with the host in the first mode to receive a control instruction, and in the second mode, controls the controlled device using the control instruction.

15. A peripheral device for communicating with a host and for controlling a controlled device, comprising:
- a USB plug, including a first pair of terminals and a second pair of terminals,
- a communication unit with a USB socket coupled to the first pair of terminals of the USB plug,
- a controlling unit with a USB socket coupled to at least two terminals selected from the first and second pair of terminals of the USB plug,
- wherein the peripheral device is arranged to receive operating power via the second pair of terminals,
- wherein the peripheral device is further arranged to selectively operate in at least a first USB mode and a non-USB second mode,
- the first USB mode being a mode in which the communication unit is operable for communicating with the host in accordance with a USB standard or an IEEE 1394 standard and the peripheral device is arranged for receiving the operating power from the host, and
- the second non-USB mode being a mode in which the controlling unit is operable for controlling the controlled device, wherein a PWM signal is generated by the peripheral device to the controlled device to indicate the peripheral device is in the second non-USB mode, the controlling not including controlling operating power, and the peripheral device is arranged for receiving the operating power from the controlled device.

* * * * *